Sept. 25, 1934.   S. G. BAITS   1,974,943
AUTOMATIC BRAKE SHOE ADJUSTMENT
Filed April 30, 1932   2 Sheets-Sheet 1
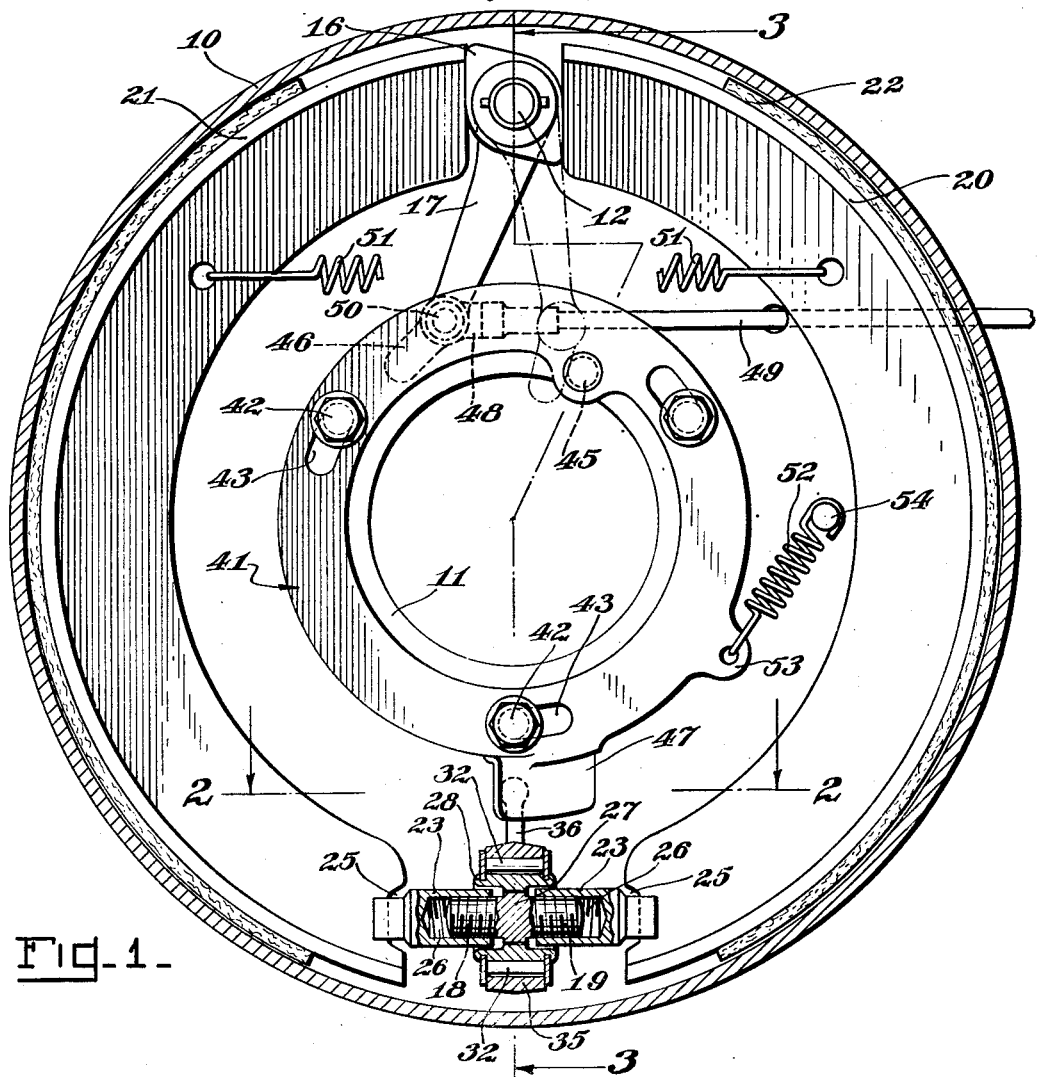
Fig_1_
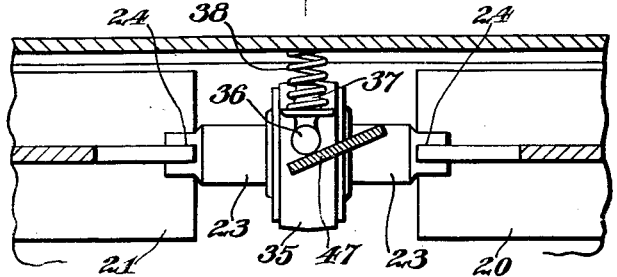
Fig_2_
INVENTOR:
Stuart G. Baits
by Macleod, Calver, Copeland & Dike
Attys.

Sept. 25, 1934.  S. G. BAITS  1,974,943
AUTOMATIC BRAKE SHOE ADJUSTMENT
Filed April 30, 1932   2 Sheets-Sheet 2
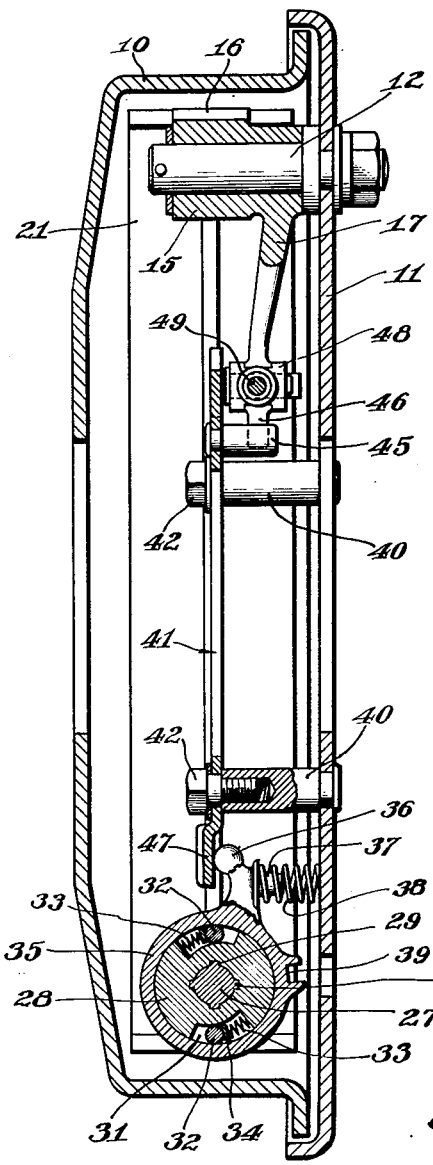
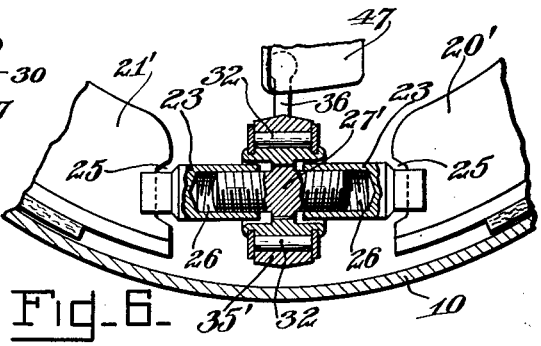
INVENTOR:
Stuart G. Baits
by Macleod, Calver, Copeland + Dike
Attys.

Patented Sept. 25, 1934

1,974,943

UNITED STATES PATENT OFFICE 1,974,943

AUTOMATIC BRAKE SHOE ADJUSTMENT

Stuart G. Baits, Grosse Pointe Park, Mich., assignor to Hudson Motor Car Company, Detroit, Mich., a corporation of Michigan Application April 30, 1932, Serial No. 608,422

1 Claim. (Cl. 188—79.5)

Vehicle brakes are provided with one or more brake shoes pivotally mounted within the drum and which carry a friction lining adapted to engage the interior of the drum. Mechanism is provided, usually including a cam adapted to engage adjacent ends of the shoes, which may be actuated to expand the brake shoes to bring the lining in engagement with the drum. These brake shoes usually are assembled within the drum upon a fixed pivot which may be adjusted from time to time after excessive wear of the brake lining. During the intervals between adjustments, the pressure of the shoes against the drum gradually becomes concentrated upon small areas due to the wearing away of the lining and as a result the efficiency of the brake is reduced.

It is an object of the present invention to overcome this difficulty and provide a brake in which the brake applying pressure is distributed substantially equally throughout the entire area of the brake shoe.

Another object of the invention is the provision of a brake in which the brake shoe is adjusted automatically as the shoe is moved in and out of engagement with the drum.

A further object of the invention is the provision of improved means for adjusting the brake shoes of a vehicle brake.

The invention will be more clearly understood from the following description in conjunction with the accompanying drawings: in which, Fig. 1 is a sectional elevational view of a vehicle brake embodying the invention;

Fig. 2 is a sectional view taken upon the line 2—2 of Fig. 1;

Fig. 3 is a sectional view taken upon the line 3—3 of Fig. 1;

Fig. 4 is a perspective view of one of the parts of the brake; and

Figs. 5 and 6 are fragmentary views in section similar to Figs. 3 and 1 respectively of a modified construction embodying the invention.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the claim hereto appended as considered in view of the prior art and the requirements thereof.

The embodiment of the invention illustrated in the accompanying drawings comprises a brake drum 10 adapted to be secured upon a vehicle wheel and a backing plate 11 adapted to be fixed upon a stationary portion of the vehicle. A bearing 12 is suitably secured to the backing plate 11 and is adapted to receive for rotation thereon a hub 15 carrying a cam 16. The hub 15 also is provided with a substantially radially extending arm 17. The arm 17 is pivotally connected to the forked end 48 of a brake operating rod 49 by a pin 50. A pair of brake shoes 20 and 21 are mounted within the drum 10 with one end of each in engagement with the cam 16. A suitable brake lining 22 is secured to each of the shoes 20 and 21 in the usual manner and provides a frictional surface adapted to engage the interior surface of the drum. The other ends of the brake shoes 20 and 21 are connected by an adjustable connection which, in the form illustrated, comprises a pair of members 23 each provided with a fork 24 at one end adapted to embrace the end of a shoe and fit in a recess 25 therein. Each of the members 23 is provided at its other end with a threaded recess 26 adapted to receive the left and right hand threaded portions 18 and 19 of a screw 27. The shoes 20 and 21 normally are held in engagement with the cam 16 and out of engagement with the drum 10 by a spring 51, the opposite ends of which are secured to the shoes 20 and 21.

A clutch is suitably associated with the screw 27 so as to move the same and comprises a clutch element 28 provided with suitable ways 29 to receive the splines 30 upon the intermediate portion of the screw 27. The clutch member 28 is provided with one or more recesses 31, the depth of which gradually changes circumferentially of the clutch element. A roller 32 is positioned in each recess 31 and normally is urged toward the shallowest part thereof by a spring 33 extending between a shoe 34 engaging said roller and one end wall of the recess. A clutch element 35 is rotatably mounted upon the clutch element 28 so as to be freely rotatable thereon in one direction, but adapted to be locked in driving relation therewith by the rollers 32 when rotated in the opposite direction. The clutch element 35 is provided with a finger 36 having a projection 37 surrounded by one end of a spring 38, the other end of which engages the backing plate 11. A depression 39 is formed in the outer surface of element 35 in the vicinity of an opening 9 in the backing plate 11.

A plurality of studs 40 are suitably secured upon the backing plate 11 and extend inwardly therefrom between the shoes 20 and 21. The free ends of the studs 40 serve as bearings for slidably supporting a ring 41 suitably mounted upon the studs 40 by screws 42 passing through elongated slots 43 in the ring 41 and engaging the studs 40. The ring 41 is provided with a projection 45 suitably secured thereto and adapted to extend into the path of movement of a finger 46 integral with and extending from the lower end of the arm 17. The ring 41 is provided with a projection 47 extending from its outer periphery at an inclination to the general plane of the brake and adapted to engage the finger 36. The ring 41 is normally held in a predetermined desired position by a spring 52, one end of which is connected to an ear 53 upon the ring 41 and the other end of which is connected to a pin 54 suitably secured upon the backing plate 11. Thus, the range of movement of the ring 41 is limited by the studs 40 which enter the elongated slots 43.

When the brake shoes are installed initially in the brake a predetermined clearance is provided between the lining carried thereby and the interior surface of the brake drum. Inasmuch as the adjacent ends of the shoes 20 and 21 are held in engagement with the cam 16 a predetermined range of movement of the cam 16 or its actuating arm 17 will cause the shoes 20 and 21 to be moved into engagement with the drum. Thus, as the brake is initially set up and adjusted a movement of the cam actuating arm 17 from the position shown in full line to that shown in dot-and-dash lines in Fig. 1 is such as to move the shoes 20 and 21 from their normal position out of engagement with the drum to a position in engagement with the drum. It will be noted that the dot-and-dash line position of the cam actuating arm 17 is such that it is just in engagement with the projection 45 upon the ring 41 when the latter is in its normal position to which it is urged by the spring 52.

When the brake lining 22 has worn so that, in order to bring the shoes 20 and 21 into engagement with the drum, it is necessary to move the cam actuating arm 17 through a greater range than that indicated from the full line to the dot-and-dash line position shown in Fig. 1, the arm 17 will engage the projection 45 and move the ring 41 against the action of the spring 52. As a result the projection 47 will engage the finger 36 to cause rotation of the clutch member 35 to drive the clutch element 28 and rotate the screw 27 resulting in an equal and opposite movement of the members 23 and the ends of the brake shoes 20 and 21. This movement is such that the initial relationship between the outer surface of the brake lining 22 and the interior surface of the brake drum 10 is restored when the brake shoes are retracted. When the cam actuating arm 17 is released the brake shoes 20 and 21 are retracted by the action of the spring 51 and at the same time the ring 41 is returned to its initial normal position by the action of the spring 52 and the clutch element 35 is returned to its initial position by the action of the spring 38. Thus, as the brake lining continues to wear away due to repeated application of the brakes, the initial relationship between the brake drum and the outer surface of the brake lining when the shoes are retracted is maintained due to the actuation of the screw 27 through the movement of the ring 41 and the overrunning clutch each time the brake shoes are expanded and retracted. When the shoes of the several brakes of a vehicle are adjusted initially, the same clearance between the lining of the brake shoes and the drums may be obtained by inserting a tool through the openings 9 in the backing plates to engage the depressions 39 of the clutch elements 35 to turn the latter and screws 27 to move the brake shoes toward the drum.

In Figs. 5 and 6 the relationship between the outer clutch element 35' and the inner clutch element 28' is such that there is no driving connection between them when the outer clutch element 35' is caused to move by excessive movement of the brake shoes to bring the latter into engagement with the drum. However, when the brake shoes are retracted, the spring 38' rotates the clutch element 35' in the opposite direction and effects a driving connection between the clutch elements 35' and 28' to cause the screw 27' to rotate and move the ends of the shoes 20' and 21' outwardly toward the drum to maintain the desired relationship between the drum and the operative surface of the brake shoes.

What I claim is:

In a vehicle brake, a drum, a pair of brake shoes, means including a movable member for expanding said shoes into engagement with the drum, an adjustable connection between said shoes, a clutch operatively associated with said connection having an element movable in one direction in a plane perpendicular to the general plane of said shoes to adjust said connection and freely movable in the opposite direction, a ring mounted with the drum to rotate in a plane perpendicular to the axis of the drum, means for limiting the range of movement of said ring, said movable member being arranged to cooperate with said ring to rotate the latter in one direction, cooperating means carried by said ring and said element whereby movement of said ring in said one direction causes movement of said element in one direction, and resilient means for returning said element and ring to their initial positions.

STUART G. BAITS.